US 8,184,550 B2

(12) United States Patent
Beck et al.

(10) Patent No.: US 8,184,550 B2
(45) Date of Patent: May 22, 2012

(54) GATEWAY WITH IMPROVED QOS AWARENESS

(75) Inventors: Michaël Andries Thomas Beck, Antwerpen-Merksem (BE); Eric Fran Elisa Borghs, Geel (BE); Steven Gerard Boucqué, Melle (BE); Thierry Pollet, Mechelen (BE); Johan Haspeslagh, Linden (BE)

(73) Assignees: IMEC, Leuven (BE); Alcatel-Lucent, Paris (FR)

( * ) Notice: Subject to any disclaimer, the term of this patent is extended or adjusted under 35 U.S.C. 154(b) by 347 days.

(21) Appl. No.: 12/107,476

(22) Filed: Apr. 22, 2008

(65) Prior Publication Data

US 2008/0267087 A1    Oct. 30, 2008

Related U.S. Application Data

(60) Provisional application No. 60/914,261, filed on Apr. 26, 2007.

(30) Foreign Application Priority Data

Apr. 27, 2007   (EP) ..................................... 07107100

(51) Int. Cl.
*G01R 31/08*   (2006.01)
(52) U.S. Cl. ................... 370/252; 370/254; 370/395.21; 370/401; 726/12
(58) Field of Classification Search .................. 370/252, 370/230, 235, 395.31, 412, 395.21, 395.53, 370/401; 715/205; 726/12
See application file for complete search history.

(56) References Cited

U.S. PATENT DOCUMENTS

| | | | |
|---|---|---|---|
| 2004/0184470 A1* | 9/2004 | Holden | 370/412 |
| 2004/0223500 A1* | 11/2004 | Sanderson et al. | 370/395.53 |
| 2005/0216822 A1* | 9/2005 | Kyusojin et al. | 715/501.1 |
| 2006/0028983 A1* | 2/2006 | Wright | 370/230 |
| 2006/0114896 A1* | 6/2006 | Beck et al. | 370/389 |
| 2006/0150244 A1* | 7/2006 | Klein et al. | 726/12 |

(Continued)

FOREIGN PATENT DOCUMENTS

EP    1 328 091 A1    7/2003

(Continued)

OTHER PUBLICATIONS

European Search Report dated Oct. 25, 2007 for EP Application. No. 07107100.5.

(Continued)

*Primary Examiner* — Kwang B Yao
*Assistant Examiner* — Vincelas Louis
(74) *Attorney, Agent, or Firm* — Knobbe Martens Olson & Bear LLP

(57) ABSTRACT

A device and method for exchanging data frames are disclosed. In one aspect, the device exchanges data between a WAN and one or more LAN segments in an optimized way leading to a better quality of experience for the user. The device comprises an interface exchanging data frames over an access network, at least a first and second subnet interface exchanging data frames and arranged for being coupled to a network, a memory storing classification rules, a classification agent extracting information from an incoming data frame and applying the rules to the extracted information to determine the interface via which the incoming data frame is to be forwarded, and a Quality of Service monitoring agent for retrieving Quality of Service information from the subnet interfaces and dynamically updating the classification rules according to the QoS information.

19 Claims, 3 Drawing Sheets

U.S. PATENT DOCUMENTS

2007/0147247 A1* 6/2007 Kalonji et al. ............... 370/235
2008/0123662 A1* 5/2008 Basso et al. ............. 370/395.31

FOREIGN PATENT DOCUMENTS

EP            1 662 718 A1     5/2006
WO    WO 2004/080024 A1     9/2004

OTHER PUBLICATIONS

Adtran AOS QoS Configuration Guide, 61200860L1-29.3G, Configuring Quality of Service (QoS) in AOS; Aug. 2009.

Beck M., "Ethernet in the First Mile: the IEEE802.3ah EFM Standard.", 1st edition, NY: McGraw-Hill Professional, 2005, p. 86-87.
IEEE Std 802.03-2005, known as the "Ethernet standard". Copyright 2005 IEEE.
IEEE Std 802.11-2003, Clause 7.3.2.2, Copyright 2003 IEEE.
Telecommunication Standardization Sector of ITU, ITU-T G.933.1 VDSL, Chapter 11, Jun. 2004.

* cited by examiner

GATEWAY WITH IMPROVED QOS AWARENESS

CROSS REFERENCE TO RELATED APPLICATIONS

This application claims priority under 35 U.S.C. §119(e) to U.S. provisional patent application 60/914,261 filed on Apr. 26, 2007, which application is hereby incorporated by reference in its entirety.

BACKGROUND OF THE INVENTION

1. Field of the Invention

The present invention relates to a networking device for exchanging data frames. In particular, the device exchanges data between a WAN and one or more LAN segments.

2. Description of the Related Technology

A residential gateway is well known in the art. Residential gateways are common devices used in home networking. They provide bridging and routing functions between on the one hand a public Wide Area Network (WAN) infrastructure such as the Internet, and on the other hand a Local Area Network (LAN). The LAN is essentially an in-house network, and typically contains a wired Ethernet-based segment and/or a wireless WiFi-based segment.

When multiple LAN segments are present, packets entering the residential gateway from the WAN side are forwarded to the respective LAN segments by application of standard bridging and/or routing rules. These rules take into account the destination address (MAC address or IP address and/or TCP/UDP port number) of the incoming packets to determine the outbound port. Additionally, the optional Virtual LAN Identifier (VID), if present, may be used to refine the forwarding decision. These very rudimentary classification rules are stored in a forwarding information base (routing table, bridging table, VLAN membership map, . . . ).

Once an outbound port has been selected, quality of service (QoS) related header fields such as the IP differentiated services code point (DSCP) field, may be checked against a set of QoS rules to determine the queue to which the packet shall be written. This behavior is common in existing devices, as may be evidenced by way of example by the operating manual of the Adtran NetVanta products (Adtran AOS QoS Configuration Guide, 61200860L1-29.3E, March 2006, available online (accessed 2007 Apr. 5) at URL http://www.adtran.com/adtranpx/Doc/0/DVA89BJ6DKAKR25MCQM8BGVD75/61200860 L1-29.3E.pdf).

More sophisticated ways of classifying incoming packets are known in the art. The classifier may take into account information about source and/or destination, as stored in the incoming packet, to determine the "flow" to which the incoming packet belongs. This "flow" represents a certain application or service, and subsequent manipulations such as forwarding, tagging, and encapsulating, may be based on the identified flow to present application-aware behavior.

A basic form of flow processing is used for demultiplexing "conversations" over the physical segments that make up an aggregated link in Ethernet's link aggregation. A residential gateway using conversations to demultiplex data traffic over interfaces with different transmission profiles is disclosed in patent application EP 1328091A, where it suffices to read the term "residential gateway" for the more general term "modem system".

Even more advanced classification schemes are known in the art for a router as in WO 2004/080024A and for an access node (for example, patent application EP1662718A). Obviously, such classification schemes could also be used in a residential gateway.

It is noted that residential users often use pre-existing cabling infrastructure to deploy point-to-point or point-to-multipoint links between devices that are capable of interacting with each other. Industry standards exist for the use of in-house telephone wiring (e.g., HomePNA (HPNA), denoting Home Phoneline Networking Association) or coaxial television wiring (e.g., MoCA—Multimedia over Coax Alliance) for this purpose. These non-native networks are cumbersome to install and maintain. As they poorly interact with dedicated LAN equipment, the result is a sub-optimal patchwork of network segments.

By their nature, the different segments of the patchwork network are more or less suited for different services. Local Area Networks offering different services over different physical interfaces of the same device are well known in the art; this paradigm is sometimes referred to as "colored interfaces" (Beck M., "Ethernet in the First Mile: the IEEE802.3ah EFM Standard.", 1st edition, NY: McGraw-Hill Professional, 2005, p. 86-87).

SUMMARY OF VARIOUS INVENTIVE ASPECTS

Certain inventive aspects relate to a networking device. The device comprises an interface for exchanging data frames over an access network, at least a first and a second subnet interface, a classification agent and a Quality of Service (QoS) monitoring agent. The subnet interfaces are arranged for being coupled to at least a first and a second network, respectively. The memory stores classification rules applicable to the data frames. The classification agent is coupled to the memory and arranged for extracting information from an incoming data frame. Further, the classification agent is arranged for applying the classification rules to the extracted information in order to determine the interface via which the incoming data frame is to be forwarded. The Quality of Service monitoring agent is arranged to retrieve Quality of Service information from the subnet interfaces. The QoS monitoring agent is further arranged for dynamically updating at least one of the classification rules according to the retrieved QoS information.

Over an access network, different services are offered with different requirements related to e.g. capacity, latency and packet loss. Different incoming data frames are forwarded to respective subnets. Both native subnet segments and segments built on legacy cabling may achieve different data rates depending on the quality of the medium and the distance between the attached stations. A prior art analysis shows that it is hard to predict the overall capacity of a patchwork network. Data frame transmission is optimized by taking into account different QoS characteristics in terms of among other things bit rate, latency and packet loss statistics (collectively referred to as a 'profile') of the different subnets. This is provided by combining a classification agent with a QoS monitoring agent. Optimized forwarding rules are added to the standard classification rules. This leads to a better utilization of the available bandwidth and to a better quality of experience for the end user.

The networking device may be a residential gateway. Such a gateway is typically a hardware device connecting a home network or a local area network (LAN) with a wide area network (WAN) or the internet. This comprises native LAN segments (e.g. Ethernet, WiFi and other segments known to the person skilled in the art), as well as with segments built on legacy cabling (e.g. HPNA, MoCA and other segments known to the person skilled in the art).

The access interface of the networking device may be a WAN interface arranged for being coupled to an access link, in particular a PON link. In another embodiment the first and second subnet interface may be arranged for being coupled to the same network.

The networking device may function as a traffic aggregator. The networking device is connected to a video decoding unit via its access interface, using a point-to-point link technology. With the networking device of this embodiment, it is possible to extend the classification rules with rules for forwarding subscribed coded video flows to the access interface.

The information extracted from the incoming data frames may comprise a source MAC address and/or a destination MAC address; a source IP address and/or a destination IP address; a virtual LAN identifier and/or a user priority indicator. Upon entry, the classification agent extracts this information from the incoming data frames. Based on this information, the classification agent recognizes the frame as being part of a particular flow and forwards it to the most appropriate subnet. Multiple, heterogeneous PHYs of the patchwork network are taken into account to optimize the data transfer.

Another inventive aspect relates to a method for exchanging data between an interface for exchanging data frames over an access network and at least a first and a second subnet interface. The method comprises the processes of: a) setting initial classification rules for identifying data frames; b) querying the subnet interfaces in order to retrieve QoS information; c) updating at least one of the initial classification rules to rules for forwarding data frames; and d) selecting an interface according to the rules for forwarding an incoming data frame in the classification agent. This method can transmit data frames in an optimized way by taking into account the different profiles of the different subnets. This is provided by combining a classification agent with a QoS monitoring agent. Optimized rules for forwarding are added to the standard classification rules. This leads to a better utilization of the available bandwidth and to a better quality of experience for the end user.

Process c) of the method may further comprise extending the forwarding rules with forwarding rules that can forward subscribed coded video flows to the WAN interface.

The method may further comprise periodically updating the forwarding rules.

In another inventive aspect, a networking device is disclosed. The device comprises a network interface for exchanging data frames over an access network. The device further comprises at least first and second subnet interfaces for exchanging data frames, the subnet interfaces being configured to be coupled to at least a first and a second network respectively. The device further comprises a memory for storing classification rules applicable to the data frames. The device further comprises a classification agent coupled to the memory and arranged for extracting information from an incoming data frame and for applying the classification rules to the extracted information in order to determine the interface via which the incoming data frame is to be forwarded. The device further comprises a Quality of Service (QoS) monitoring agent configured to retrieve quality of service information from the subnet interfaces and to dynamically update at least one of the classification rules based on the retrieved QoS information.

In another aspect, a networking device is disclosed. The device comprises a wide area network (WAN) interface connected to a wide area network, a first and second subnet interface configured to be coupled to a first and second subnetwork respectively, a classification agent configured to extract information from a data frame coming from the WAN interface and to forward the data frame to one of the subnet interfaces based on the extracted information according to one or more classification rules, and a Quality of Service (QoS) monitoring agent configured to retrieve quality of service information from at least one subnet interface and to dynamically update the classification rules based on the retrieved QoS information.

In another aspect, a networking device is disclosed. The device comprises means for retrieving quality of service information from at least one subnet interface, means for dynamically updating classification rules based on the retrieved quality of service information, and means for forwarding a data frame coming from the wide area network interface to one of the subnet interfaces based information included in the data frame and the updated classification rules.

BRIEF DESCRIPTION OF THE DRAWINGS

The invention will be further elucidated by means of the following description and the appended figure.

DETAILED DESCRIPTION OF CERTAIN INVENTIVE EMBODIMENTS

Figure 1:
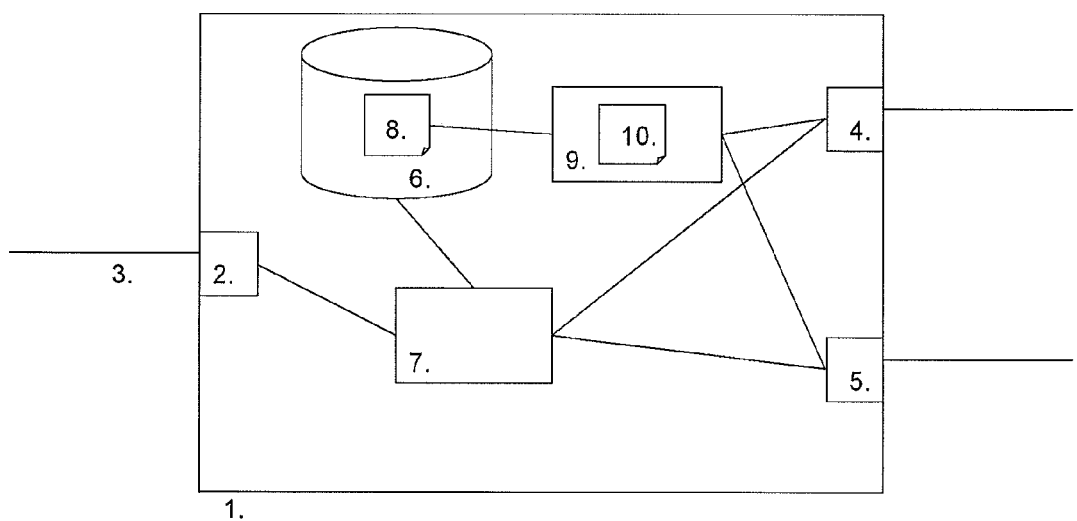
FIG. 1 represents a schematic the different blocks of one embodiment of the networking device.

The present invention will be described with respect to particular embodiments and with reference to certain drawings. The invention is however not limited thereby but only by the claims. The drawings described are only schematic and are non-limiting. In the drawings, the size of some of the elements may be exaggerated and not drawn on scale for illustrative purposes.

Detection of services and proper assignment of services to network segments remains a delicate task. To optimize transmission of incoming data over the different available network segments, more sophisticated rules for forwarding are necessary than pure bridging or routing. On the one hand, the different subnet segments may have different profiles in terms of for instance data capacity, latency, and packet loss. On the other hand, different services offered by the access link (e.g. WAN link) may have different requirements related to for instance capacity, latency, and packet loss.

Certain embodiments match the requirements of the different services offered by the WAN link to the capabilities of the different subnet segments, taking into account the topological restrictions. In particular, the available network topology may provide several paths over different subnet segments from the networking device (e.g. residential gateway) to a first end point, while providing only one path over one specific network segment from the networking device to a second end point. Matching services to adequate network segments leads to better utilization of the available bandwidth and to a better quality of experience for the end user.

Certain embodiments relate to a networking device for exchanging data frames over an interface and/or different subnets. The interface is preferably an access interface coupled for example to a public Wide Area Network (WAN)

infrastructure such as the Internet. The device is adapted to exchange data frames according to rules for forwarding data frames over the network and the available subnets.

A subnet may be a Local Area Network (LAN) comprising different segments. A subnet may comprise native LAN segments (e.g. Ethernet, WiFi and other segments known to the person skilled in the art), as well as with segments built on legacy cabling (e.g. HPNA, MoCA and other segments known to the person skilled in the art).

A networking device is presented wherein a QoS monitoring agent is adapted to retrieve Quality of Service information, such as capacity, packet loss, and latency characteristics, from the in-house network segments. This Quality of Service information is used to dynamically update the classification rules.

FIG. 1 shows one embodiment of the networking device. In an exemplary embodiment, the networking device (1), which may operate for example as a residential gateway, is connected to the Internet via its WAN interface (2) coupled to a PON link (3). For example, as in a typical in-house network a first subnet interface (4) is coupled to a wireline-based network and a second subnet interface (5) is coupled to a wireless-based network. In one example, the networking device provides access to a local IEEE Std 802.11g wireless network via its first LAN interface (4) and to a local 10/100BASE-T Ethernet network via its second LAN interface (5). The initial classification rules in the memory (6) are set to identify different video flows along with their minimum bit rate and maximum packet loss and latency requirements. Upon initial entry into service, the Quality of Service monitoring agent (9) queries the management information base (MIB) of both LAN interfaces (4) and (5) to obtain values of negotiated bit rates, packet loss statistics, and (inferred) link latencies. The classification rules are now extended with rules for forwarding that ensure proper attribution of the (video) flows to the LAN segment that best meets their respective requirements. From this point on, incoming packets that are recognized by the classification agent (7) as belonging to a particular flow, based on the extracted information (8), are forwarded to the most appropriate LAN. The querying of the MIB and update of the forwarding rules are repeated periodically.

In an alternative embodiment, the networking device (1), functioning as a traffic aggregator, is connected to a video decoding unit via its WAN interface (2) using a chosen point-to-point link technology (3). The traffic aggregator exchanges data with an IEEE Std 802.11g wireless network via its first LAN interface (4) and with a local 10/100BASE-T Ethernet network via its second LAN interface (5). The initial classification rules in the memory (6) are set to identify incoming coded video flows, emanating from a video server, arriving via the LAN interfaces, and video return channel information emanating from the video decoder, arriving via the WAN interface. Upon initial entry into service, the Quality of Service monitoring agent (9) queries the management information base of both LAN interfaces (4) and (5) to obtain values of negotiated bit rates, packet loss statistics, and (inferred) link latencies. The classification rules are now extended with rules for forwarding that ensure proper attribution of video return channel information to the LAN segment that is best suited to carry the information back to the video server. The classification rules are further extended with rules for forwarding subscribed coded video flows to the WAN interface. From this point on, incoming packets that are recognized by the classification agent (7) as belonging to a particular flow, based on the extracted information (8), are forwarded to the appropriate network interface. The querying of the MIB and update of the forwarding rules are repeated periodically.

In another aspect of the invention transmissions can be relayed from a first end point connected to at least one of the residential gateway's network segments to either a second end point connected to at least one of the residential gateway's network segments, or the WAN interface, taking into account the topological restrictions. This aspect is also achieved by the operation of the QoS monitoring agent described above, with the additional requirement that the classification table contain rules that distinguish local area traffic from traffic that leaves the local area network segments. In an exemplary embodiment for this object, the networking device (1), functioning as a residential gateway, is connected to the Internet via its WAN interface (2) coupled to a PON link (3). The networking device provides access to a local IEEE Std 802.11g wireless network via its first LAN interface (4) and to a local 10/100BASE-T Ethernet network via its second LAN interface (5). The initial classification rules in memory (6) are set to identify flows from handheld data acquisition/generation devices connected to the 802.11g wireless network along with their minimum bit rate and maximum packet loss and latency requirements, the flows being destined for storage devices attached to the LAN interfaces. Upon initial entry into service, the Quality of Service monitoring agent (9) queries the management information base of both LAN interfaces (4) and (5) to obtain values of negotiated bit rates, packet loss statistics, and (inferred) link latencies. The classification rules are now extended with forwarding rules that ensure proper attribution of the flows to the LAN segment that best meets their respective requirements. From this point on, incoming packets that are recognized by the classification agent (7) as belonging to a particular flow, based on the extracted information (8), will be forwarded to the most appropriate LAN. The querying of the MIB and update of the forwarding rules are repeated periodically.

An exemplary mode for carrying out certain embodiments is described below. IEEE Std 802.3-2005, known as the "Ethernet standard", contains specifications of several physical layer types that are commonly used in home networks, such as 10BASE-T, 100BASE-T, and 1000BASE-T. These three port types all operate over multiple strands of twisted copper pair, and employ the same physical medium connector (of the type RJ-45). The end-user can essentially consider this as one single technology, because the stations at both ends of the wire determine their best common capabilities through the auto-negotiation process. The auto-negotiation process results among other things in a common transmission rate and duplicity. IEEE Std 802.3-2005 Clause 22 specifies the physical interface between the Ethernet MAC and PHY, which consist of a data interface (MII) and a management interface (MDIO). Via registers 0.6 and 0.13 of the MDIO, the MAC can access the actual transmission rate of the PHY, while register 0.8 indicates the duplicity. The MAC can also access various error counters and ascertain whether the attached Ethernet PHY is operational or not.

Clauses 61-63 of the same standard specify the technology known as "Ethernet in the First Mile" over point-to-point voice-grade copper wiring. Although the standard situates the use of this technology in subscriber access networks, the use of 10PASS-TS in large LANs over existing wiring is not precluded. In 10PASS-TS, as in most xDSL technologies, the physical layer trains to the best achievable bit rate and latency that can be supported by the medium (barring more stringent constraints from the network manager). For 10PASS-TS, this rate can be anywhere between 0 and 100 Mb/s. The extended MDIO specified in Clause 45 of IEEE Std 802.3-2005 provides the MAC access to the actual trained speed through its register 1.31.15:5. The MAC can also access various error counters and physical transmission parameters, and ascertain whether the attached 10PASS-TS PHY is operational or not.

In Wireless LANs according to the IEEE Std 802.11-2003 standards family, management frames may contain a "Supported Rates element" (clause 7.3.2.2). Furthermore, the PHY service interface provides a DATARATE parameter in the TXVECTOR and RXVECTOR vectors (12.3.4.4). These elements allow the IEEE 802.11 MAC to learn, via the implementation of the abstract MLME_PLME_SAP interface, the theoretical and the effective data rate of the wireless medium towards various peers at any time. The IEEE 802.11 MIB contains a Dot11 CountersEntry, which stores information with relevance to QoS that can be supported, such as counters of failures, retries, RTS misses, ACK misses, etc. The extensions defined by IEEE Std 802.11e additionally provide the very useful managed objects dot11QosOptionImplemented, ot11QosDiscardedFragmentCount, and dot11QosCounters. All this clearly demonstrates that the higher layers can obtain valuable QoS information via existing interfaces. The MAC can also access various error counters and physical transmission parameters, and ascertain whether the attached 802.11 PHY is operational or not.

The PHY specified in ITU-T Recommendation G.9954 on provides transmission and reception of physical layer frames over in-house phone wire media. It supports 2, 4, 8, 16 and 24 Mbaud symbol rates with 2 to 10 bits-per-symbol constellation encoding, providing data rates in the range of 4-240 Mbit/s. Again, G.9954 management includes all the facilities that are required in order to collect information from the PHY and other (sub)layers.

Based on the information collected by the MAC from the PHY, as indicated in the examples above, appropriate allocation of services to PHYs can take place. Obviously, PHYs that are no longer operational or have retrained to extremely low-quality operational parameters should not be selected for sensitive data transmissions. However, more subtle traffic allocation criteria are needed, as it is generally known that different services put different demands on the physical layer. In ITU-T G.993.1 VDSL for example, which supports the option of "dual latency", it is stated that "the lowest level of protection is required to support latency sensitive services such as voice, while the highest level is required to support burst error sensitive services such as entertainment video." As stated before, it is known in the art that the required demultiplexing can take place automatically at the level of the MAC (EP 1328091 A). One embodiment generalizes this approach by taking into account multiple, heterogeneous PHYs, and using information that is retrieved in real time from the various PHYs via their respective management interfaces to optimize PHY selection.

Figure 2:
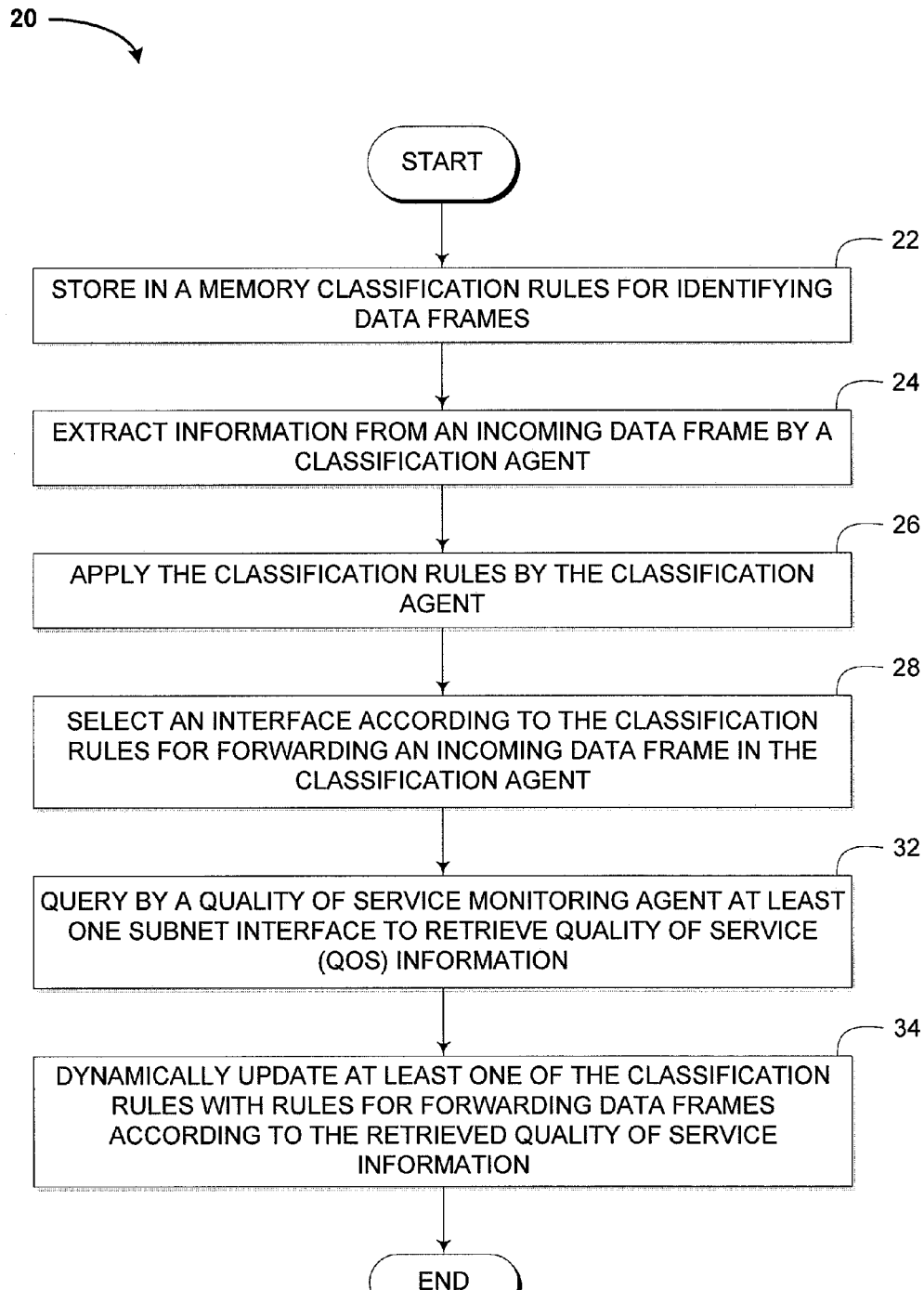
FIG. 2 is a flowchart illustrating one embodiment of a method of exchanging data frames between a network interface and at least first and second subnet interfaces.

FIG. 2 is a flowchart illustrating one embodiment of a method of exchanging data frames between a network interface and at least first and second subnet interfaces. Depending on the embodiment, certain steps of the method may be removed, merged together, or rearranged in order. The method 20 starts at a block 22, wherein classification rules for identifying data frames is stored in a memory. Moving to a block 24, information is extracted from an incoming data frame by a classification agent. Next at a block 26, the classification rules are applied by the classification agent. Moving to a block 28, an interface is selected according to the classification rules for forwarding an incoming data frame in the classification agent. Next at a block 32, at least one of the subnet interfaces is queried by a quality of service monitoring agent in order to retrieve quality of service (QoS) information. Moving to a block 34, at least one of the classification rules is dynamically updated with rules for forwarding data frames according to the retrieved quality of service information.

Figure 3:
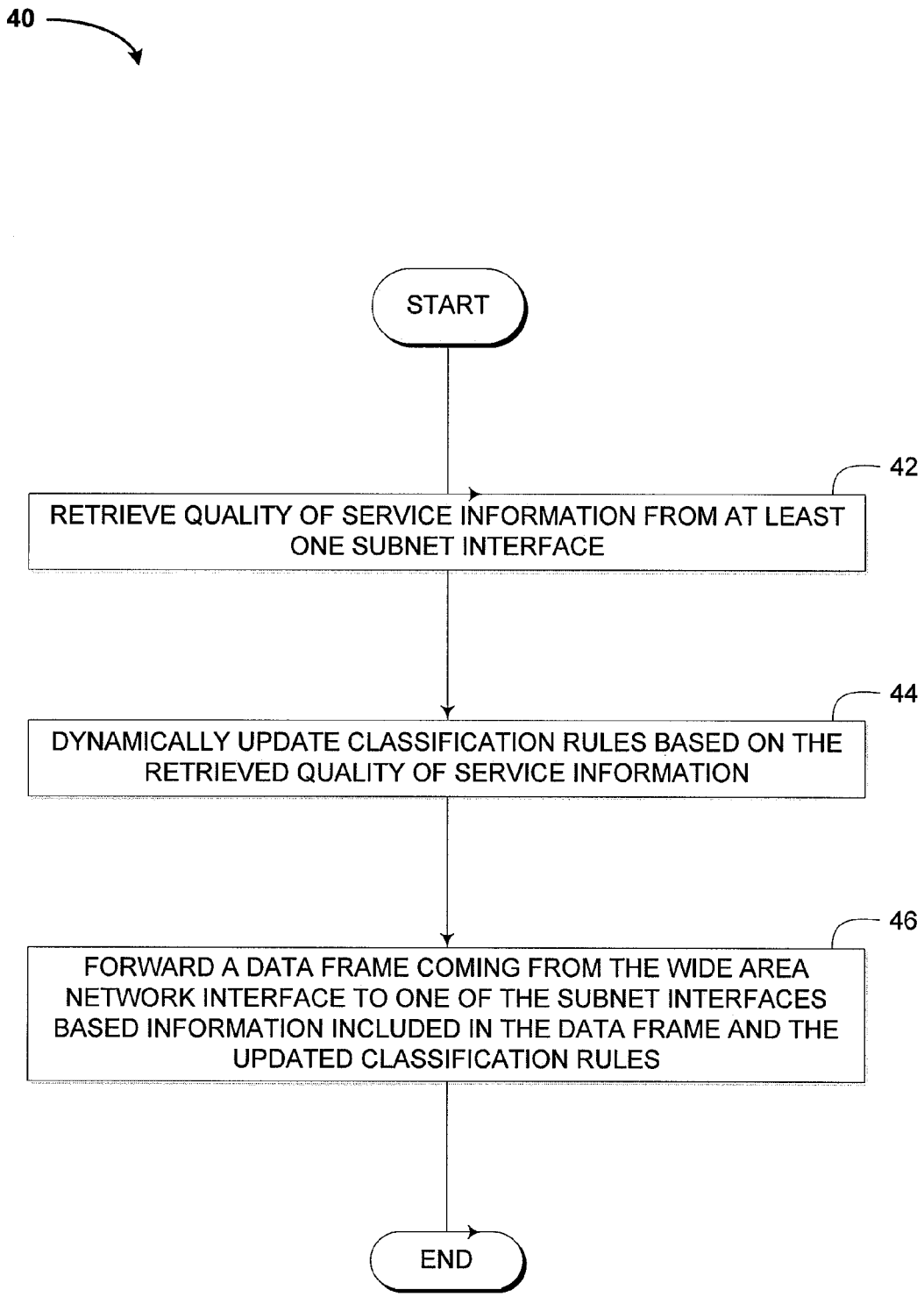
FIG. 3 is a flowchart illustrating one embodiment of a method of forwarding data frames from a wide area network interface to a first and second subnet interface.

FIG. 3 is a flowchart illustrating one embodiment of a method of forwarding data frames from a wide area network interface to a first and second subnet interface. Depending on the embodiment, certain steps of the method may be removed, merged together, or rearranged in order. The method 40 starts at a block 42, wherein quality of service information is retrieved from at least one subnet interface. Moving to a block 44, classification rules are dynamically updated based on the retrieved quality of service information. Next at a block 46, a data frame coming from the wide area network interface is forwarded to one of the subnet interfaces based information included in the data frame and the updated classification rules.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices. The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A networking device comprising:
   a network interface connected to an access network;
   at least first and second subnet interfaces coupled to at least a first and a second subnetwork respectively;
   a memory for storing classification rules applicable to data frames;
   a classification agent arranged for extracting, from an incoming data frame received via the network interface, information indicative of the data frame's requirement for network quality of service and for applying the classification rules to select one of the subnet interfaces via which the incoming data frame is to be forwarded according to meeting the data frame's requirement for network quality of service, the selecting being based on the extracted information from the data frame and the classification rules; and
   a quality of service (QoS) monitoring agent configured to query the subnet interfaces and retrieve quality of service information indicative of available network resources of the subnet interfaces and to dynamically update at least one of the classification rules based on the retrieved QoS information with rules for forwarding data frames to the subnet interface best arranged for meeting the data frame's quality of service requirement.

2. The networking device of claim 1, wherein the device is a residential gateway.

3. The networking device of claim 1, wherein the network interface is a wide area network interface configured to be coupled to an access link.

4. The networking device of claim 1, wherein the network interface is a wide area network interface arranged for being coupled to a point-to-point link.

5. The networking device of claim 1 wherein each of the first and second subnet interface is configured to be connected to at least one of the following networks: local area network, wireless local area network, Ethernet, power line, multimedia over coax alliance, and home phoneline networking association.

6. The networking device of claim 1, wherein the extracted information comprises a source MAC address and/or a destination MAC address.

7. The networking device of claim 1, wherein the extracted information comprises a source IP address and/or a destination IP address.

8. The networking device of claim 1, wherein the extracted information comprises a virtual LAN identifier.

9. The networking device of claim 1, wherein the extracted information comprises a user priority indicator.

10. A method of exchanging data frames between a network interface and at least first and second subnet interfaces, the method comprising:
storing in a memory classification rules for forwarding data frames; extracting information from an incoming data frame by a classification agent, wherein the incoming data frame is received via the network interface; applying the classification rules by the classification agent;
selecting one of the first and second subnet interface via which the incoming data frame is to be forwarded according to the classification rules;
querying by a quality of service monitoring agent at least one of the subnet interfaces in order to retrieve quality of service (QoS) information indicative of available network resources of the subnet interfaces; and
dynamically updating at least one of the classification rules with rules for forwarding data frames.

11. The method of claim 10, wherein the updating of classification rules further comprises extending the classification rules with rules for forwarding data flows to the network interface.

12. The method of claim 11, further comprising periodically updating the rules for forwarding.

13. A networking device comprising:
a wide area network (WAN) interface configured to be connected to a wide area network;
a first and second subnet interface configured to be coupled to a first and second subnetwork respectively;
a classification agent configured to extract, from a data frame coming from the WAN interface, information indicative of the data frame's requirement for network quality of service, and to apply one or more classification rules to select one of the subnet interfaces via which the data frame is to be forwarded according to meeting the data frame's requirement for network quality of service, the selecting being based on the extracted information from the data frame and the classification rules; and
a quality of service (QoS) monitoring agent configured to query the subnet interfaces and retrieve quality of service information indicative of available network resources of the subnet interfaces and to dynamically update the classification rules based on the retrieved QoS information with rules for forwarding data frames to the subnet interface best arranged for meeting the data frame's quality of service requirement.

14. The device of claim 13, wherein the retrieved QoS information represent QoS characteristics of at least one subnetwork.

15. The device of claim 13, wherein the retrieved QoS information comprises at least one of the following: bit rate, latency, and packet loss.

16. The device of claim 13, wherein the wide area network interface is configured to be coupled to a wide area network via an access link.

17. The device of claim 13, wherein the wide area network interface is coupled to a wide area network via a point-to-point link.

18. A method of forwarding data frames from a wide area network interface to a first and second subnet interface, the method comprising:
retrieving quality of service information from at least one subnet interface indicative of available network resources of the subnet interface;
dynamically updating classification rules based on the retrieved quality of service information;
extracting from, a data frame coming from the wide area network interface, information indicative of the data frame's requirement for network quality of service; and
selecting one of the subnet interfaces via which the data frame is to be forwarded according to meeting the data frame's requirement for network quality of service, the selecting being based on the extracted information from the data frame and the updated classification rules.

19. The method of claim 18, wherein the retrieved QoS information represents QoS characteristics of at least one subnetwork connected to one of the subnet interface.

* * * * *